(12) United States Patent
Ford

(10) Patent No.: US 8,453,673 B2
(45) Date of Patent: Jun. 4, 2013

(54) VALVE CAGE FOR A PUMP

(76) Inventor: Michael Brent Ford, St. George, UT (US)

(*) Notice: Subject to any disclaimer, the term of this patent is extended or adjusted under 35 U.S.C. 154(b) by 175 days.

(21) Appl. No.: 12/428,316

(22) Filed: Apr. 22, 2009

(65) Prior Publication Data

US 2010/0269928 A1 Oct. 28, 2010

(51) Int. Cl.
*F16K 15/04* (2006.01)

(52) U.S. Cl.
USPC ................ 137/533.11; 137/533.19

(58) Field of Classification Search
USPC ............ 137/533.13, 533.19, 543, 543.19, 137/533.11
See application file for complete search history.

(56) References Cited

U.S. PATENT DOCUMENTS

| 1,555,068 | A | * | 9/1925 | Nixon | 137/331 |
| 3,503,079 | A | * | 3/1970 | Smith | 623/2.34 |
| 3,845,781 | A | * | 11/1974 | Hansen et al. | 137/331 |
| 5,178,184 | A | * | 1/1993 | Skillman | 137/533.13 |
| 6,685,451 | B1 | * | 2/2004 | Ivey | 417/555.2 |
| 7,069,997 | B2 | * | 7/2006 | Coyes et al. | 166/328 |

* cited by examiner

*Primary Examiner* — Kevin Lee
*Assistant Examiner* — Macade Brown
(74) *Attorney, Agent, or Firm* — Weiss & Moy, P.C.; Jeffrey D. Moy

(57) ABSTRACT

A valve cage device is adapted for use with a subsurface pump or the like. The valve cage includes a housing and an insert. The insert includes a cradle, a plurality of angled ribs, and a base. In one embodiment, the insert may also include an extended nose region. A ball and seat may be positioned in the valve cage.

18 Claims, 9 Drawing Sheets

VALVE CAGE FOR A PUMP

FIELD OF THE INVENTION

The present invention relates generally to fluid pumping apparatuses and, more particularly, to a valve cage for use with a subsurface pump, that allows for improved flow of fluids during pumping operations.

BACKGROUND OF THE INVENTION

Oil well pumping systems are well known in the art. Such systems are used to mechanically remove oil or other fluid from beneath the earth's surface, particularly when the natural pressure in an oil well has diminished. Generally, an oil well pumping system begins with an above-ground pumping unit, which may commonly be referred to as a "pumpjack," "nodding donkey," "horsehead pump," "beam pump," "sucker rod pump," and the like. The pumping unit creates a reciprocating (up and down) pumping action that moves the oil (or other substance being pumped) out of the ground and into a flow line, from which the oil is then taken to a storage tank or other such structure.

Below the ground, a shaft is lined with piping known as "tubing." Into the tubing is inserted a string of sucker rods, which ultimately is indirectly coupled at its north end to the above-ground pumping unit. The string of sucker rods is ultimately indirectly coupled at its south end to a subsurface or "down-hole" pump that is located at or near the fluid in the oil well. The subsurface pump has a number of basic components, including a barrel and a plunger. The plunger operates within the barrel, and the barrel, in turn, is positioned within the tubing. It is common for the barrel to include a standing valve and the plunger to include a traveling valve. The standing valve has a ball therein, the purpose of which is to regulate the passage of oil from down-hole into the pump, allowing the pumped matter to be moved northward out of the system and into the flow line, while preventing the pumped matter from dropping back southward into the hole. Oil is permitted to pass through the standing valve and into the pump by the movement of the ball off its seat, and oil is prevented from dropping back into the hole by the seating of the ball. North of the standing valve, coupled to the sucker rods, is the traveling valve. The traveling valve regulates the passage of oil from within the pump northward in the direction of the flow line, while preventing the pumped oil from dropping back southward, in the direction of the standing valve and hole.

Actual movement of the pumped substance through the system will now be discussed. Oil is pumped from a hole through a series of downstrokes and upstrokes of the pump, which motion is imparted by the above-ground pumping unit. During the upstroke, formation pressure causes the ball in the standing valve to move upward, allowing the oil to pass through the standing valve and into the barrel of the oil pump. This oil will be held in place between the standing valve and the traveling valve. In the traveling valve, the ball is located in the seated position, held there by the pressure from the oil that has been previously pumped.

On the downstroke, the ball in the traveling valve unseats, permitting the oil that has passed through the standing valve to pass therethrough. Also during the downstroke, the ball in the standing valve seats, preventing pumped oil from moving back down into the hole. The process repeats itself again and again, with oil essentially being moved in stages from the hole, to above the standing valve and in the oil pump, to above the traveling valve and out of the oil pump. As the oil pump fills, the oil passes through the pump and into the tubing. As the tubing is filled, the oil passes into the flow line, and is then taken to the storage tank or other such structure.

The ball and seat components used in both the traveling valve and the standing valve are exposed to excessive wear as a result of a number of factors. For example, pumps typically allow for the turbulent flow of fluids at high pressures. This turbulent flow promotes wear of pump components. In particular, in conventional pumping systems, the ball is allowed to move uncontrolled in the valve cage, eventually causing damage to both the ball and valve cage. In this regard, while the ball is moving uncontrolled in the valve cage, the fluid must redirect itself and pass by the ball to exit the valve cage. This causes great turbulence and slows the passage of fluid, reducing the volume of fluid that is allowed to pass. As another example, in some typical valve cages, the ball maintains a consistent point of contact with the interior surface of the valve cage during pumping operations. As a result, over time, the action of the ball causes solids to accumulate. Once the solids accumulate, they can prevent the ball from reseating, eventually causing the ball to get stuck in the valve cage. Further, when the pump of conventional pumping systems is in the upstroke, the ball falls randomly and is required to search for the seat area. This action causes damage to the ball and reduces the efficiency of the pump, as the ball takes longer to seat. This can be problematic especially in situations where high amounts of solids are present, as the ball may stick in the cage.

Eventually, pump components need to be replaced as a result of being exposed to excessive wear and damage. In the past, valve cages have been equipped with hard liners, in order to increase valve cage life. However, hard liners can be expensive.

The present invention addresses these issues encountered in prior art pumping systems and provides other, related, advantages.

SUMMARY OF THE INVENTION

In accordance with one embodiment of the present invention, a valve cage is disclosed. The valve cage comprises, in combination: a housing having a north end and a south end; and an insert adapted to be positioned in the housing, comprising, in combination: a base portion adapted to abut a seat; a cradle portion adapted to releasably retain a ball; and a plurality of angled ribs, wherein each rib of the plurality of ribs extends upwardly from the base portion to the cradle portion, wherein the plurality of ribs define channels therebetween.

In accordance with another embodiment of the present invention, a valve cage is disclosed. The valve cage comprises, in combination: a housing having a north end and a south end, wherein a first interior portion of the housing proximate the north end includes a first threaded region and a second interior portion of the housing proximate the south end includes a second threaded region; and an insert adapted to be positioned in the housing, comprising, in combination: a base portion adapted to abut a seat, wherein the base portion includes an angled lip adapted to abut a third interior portion of the housing; a cradle portion adapted to releasably retain a ball, wherein the cradle portion is substantially cup-shaped; and a plurality of angled ribs, wherein each rib of the plurality of ribs extends upwardly from the base portion to the cradle portion, wherein the plurality of ribs define channels therebetween; wherein an exterior diameter of the cradle portion is less than an exterior diameter of the base portion, such that the insert is upwardly tapered.

In accordance with a further embodiment of the present invention, a valve cage is disclosed. The valve cage comprises, in combination: a housing having a north end and a south end, wherein an interior portion of the housing proximate the south end includes a threaded region; and an insert adapted to be positioned in the housing, comprising, in combination: a base portion adapted to abut a seat, wherein the base portion includes an angled lip adapted to abut an interior portion of the housing; a cradle portion adapted to releasably retain a ball, wherein the cradle portion is substantially cup-shaped; and a plurality of angled ribs, wherein each rib of the plurality of ribs extends upwardly from the base portion to the cradle portion, wherein the plurality of ribs define channels therebetween; wherein an exterior diameter of the cradle portion is less than an exterior diameter of the base portion, such that the insert is upwardly tapered.

DETAILED DESCRIPTION OF THE PREFERRED EMBODIMENTS

Figure 2:
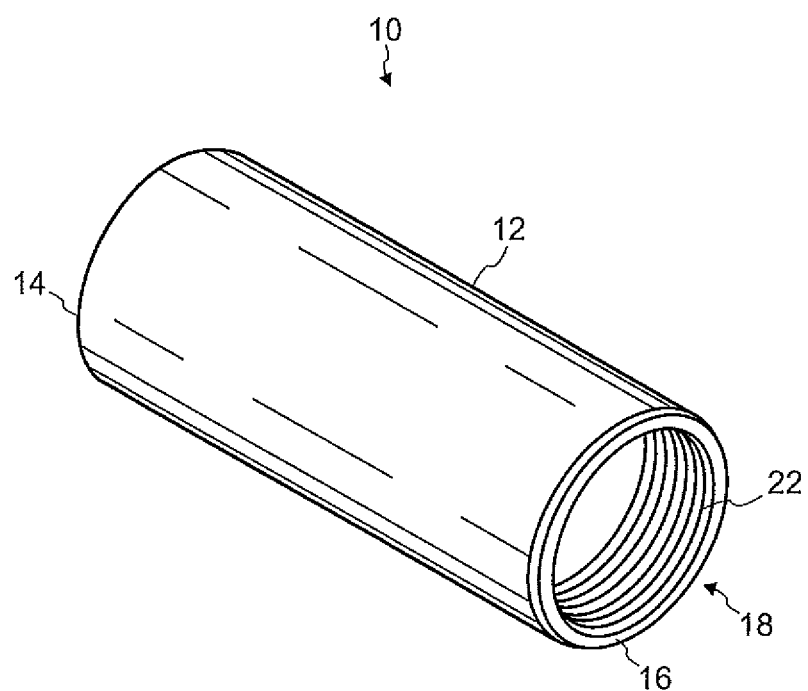
FIG. 2 is a perspective view of a valve cage device, consistent with an embodiment of the present invention.
Figure 3:
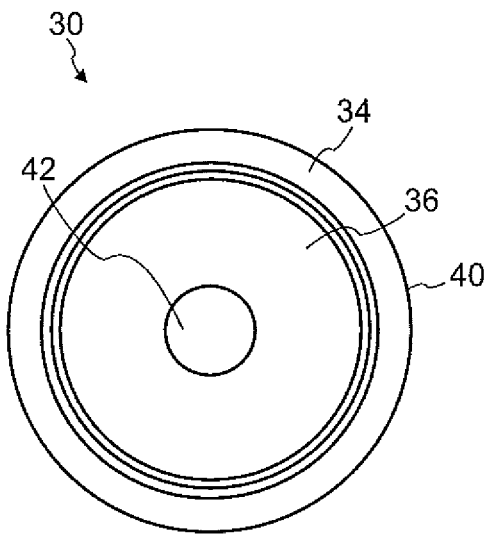
FIG. 3 is a bottom view of the insert portion of FIG. 1.
Figure 4:
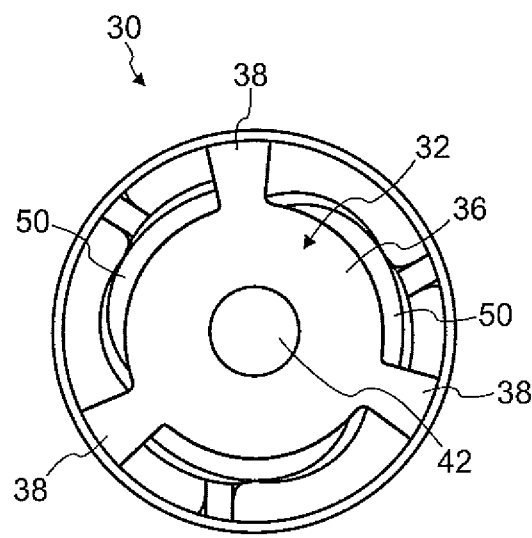
FIG. 4 is a top view of the insert portion of FIG. 1.
Figure 5:
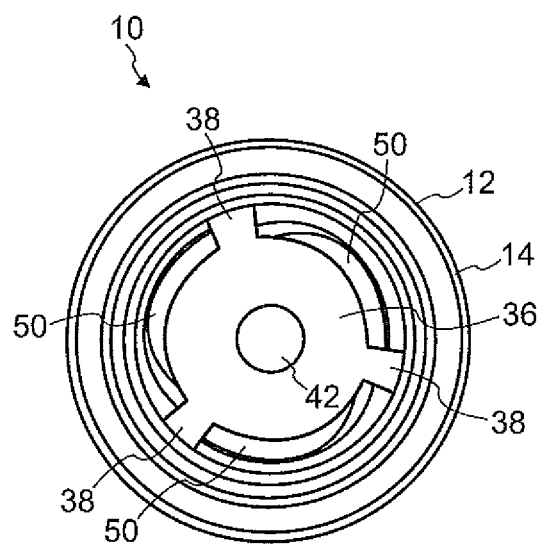
FIG. 5 is a top view of the valve cage device of FIG. 2.
Figure 6:
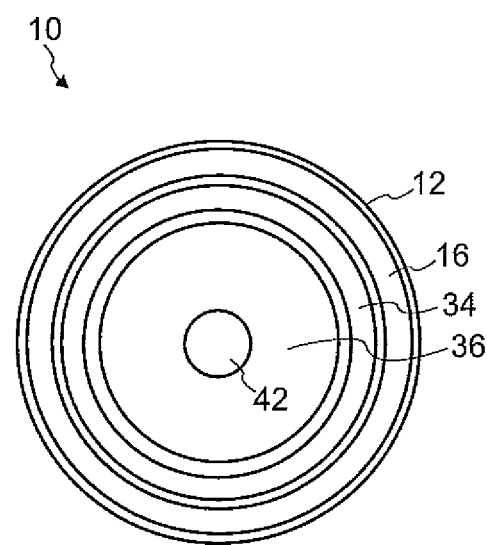
FIG. 6 is a bottom view of the valve cage device of FIG. 2.
Figure 8:
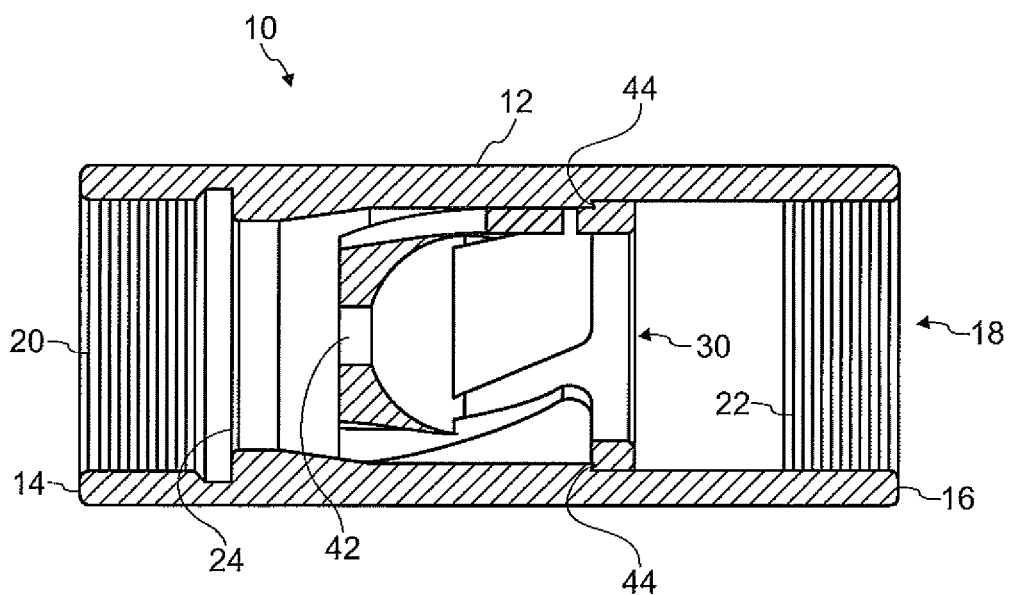
FIG. 8 is a cut away view of the valve cage device of FIG. 2.

Referring first to FIGS. 2 and 8, a valve cage device 10 ("valve cage 10") consistent with an embodiment of the present invention is shown. The valve cage 10 generally comprises the following basic components: a housing 12, and an insert 30 (as seen in FIG. 8, for example). The valve cage 10 is preferably a one-piece structure and may be composed of a hardened material, such as carbide, an alloy or some other suitable material capable of withstanding conditions present in typical oil well environments. In this embodiment, the valve cage 10 is configured as a traveling valve cage.

Figure 7:
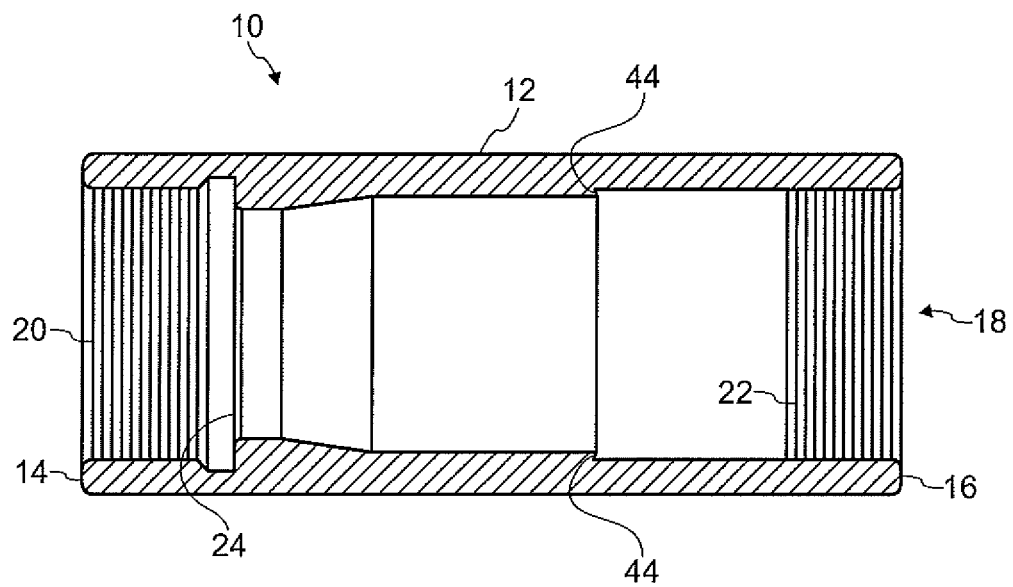
FIG. 7 is a cut away view of the valve cage device of FIG. 2, with an insert portion thereof having been removed.

Turning first to the housing 12, the overall configuration of the housing 12 is substantially tubular. A longitudinal channel 18 runs through the housing 12, such that the housing 12 is adapted to receive insert 30 therein. The valve cage 10 includes a north end 14 and a south end 16. Referring to FIG. 7, an interior portion of the housing 12 proximate the north end 14 preferably includes a threaded region 20, such that the north end 14 of the valve cage 10 may be coupled to a southern portion of a conventional pump plunger (not shown) or the like. Similarly, an interior portion of the housing 12 proximate the south end 16 preferably includes a threaded region 22, such that the south end 16 of the valve cage 10 may be coupled to a conventional seat plug (not shown) or the like. In one embodiment, the threaded regions 20 and 22 may comprise threading ranging from approximately 1.0"-14 to 1.25"-14 threading, or some other suitable threading, as may be suitable for housings having various dimensions. In one embodiment, the threaded regions 20 and 22 may have an overall height ranging from approximately 0.656 to 0.680 inches, or some other height that may be suitable for housings of various dimensions. The threaded regions 20 and 22 may comprise either male or female threading configurations, as desired.

Also in an interior portion of the housing 12 is a shoulder 24. The shoulder 24 is preferably positioned proximate threaded region 20. The shoulder 24 is preferably substantially squared-off. In this way, when the north end 12 of the valve cage 10 is coupled to a conventional pump plunger or the like, the shoulder 24 may abut the southern portion of the pump plunger. This assists in rendering a tight fit between the valve cage 10 and the pump plunger. As seen in this embodiment, preferably the shoulder 24 has an overall diameter that is greater than the diameter of threaded region 20. In one embodiment, shoulder 24 may have an overall diameter ranging from 1.015 to 1.265 inches, or some other diameter that may be suitable for housings of various dimensions.

With respect to the dimensions of the housing 12, in one embodiment, the housing 12 may have an overall length from the north end 14 to the south end 16 ranging from approximately 3.3 to 3.562 inches, an exterior diameter ranging from approximately 1.220 to 1.475 inches, and an interior diameter at threaded regions 20 and 22 ranging from approximately 1.0 to 1.25 inches. However, it will be recognized by those skilled in the art that the housing 12 may have various other dimensions, as appropriate for differently-sized pumping systems, and as based on market demand for various-sized valve cages 10. For example, in another embodiment, the housing 12 may have an exterior diameter ranging from approximately 1.125 to 6 or 7 inches or more.

Figure 1:
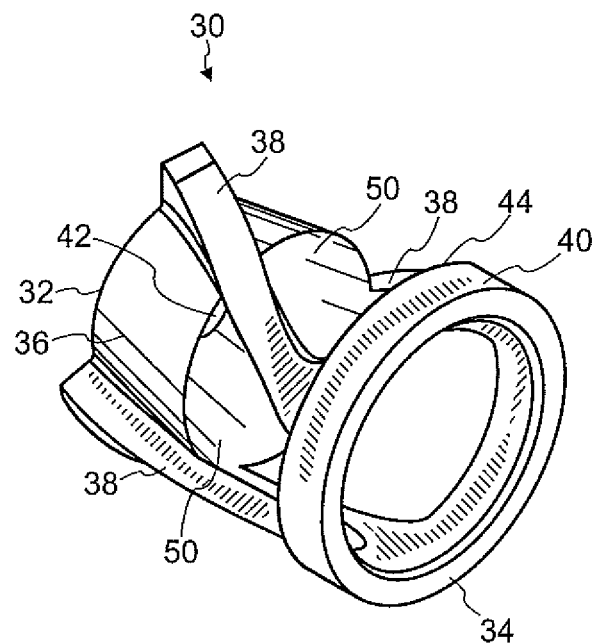
FIG. 1 is a perspective view of an insert portion of a valve cage device, consistent with an embodiment of the present invention.
Figure 9:
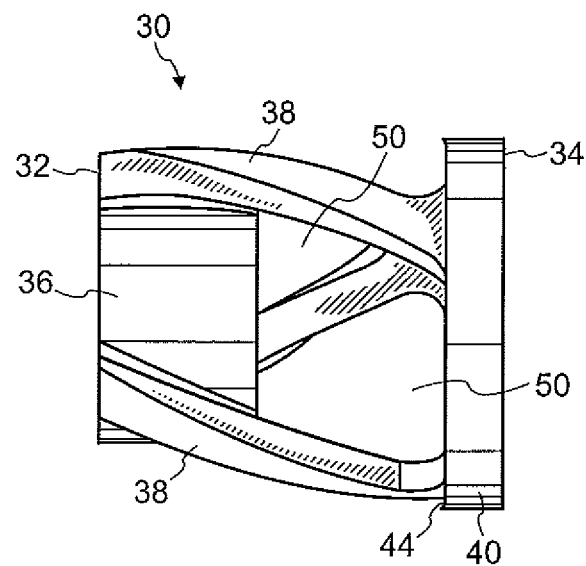
FIG. 9 is a side view of the insert portion of FIG. 1.
Figure 10:
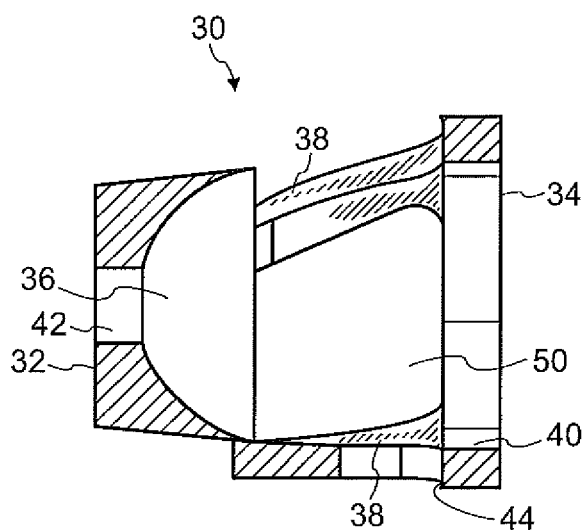
FIG. 10 is a cross-sectional view of the insert portion of FIG. 9.

Referring now to FIGS. 1, 3, 4, 9 and 10, the insert 30 is shown in detail. Turning first to FIGS. 1 and 9, it can be seen that the insert 30 comprises the following main components, beginning from a north end 32 to a south end 34: a cradle 36, a plurality of ribs 38, and a base 40. The insert 30 is adapted to be pressed into the housing 12 of the valve cage 10, such that an outer portion of the insert 30 abuts against an inner portion of the housing 12. In one embodiment, the insert 30 may have an overall length from the north end 32 to the south end 34 ranging from approximately 1.003 to 1.281 inches. In another embodiment, the insert 30 may have an overall length that is less than 1.003 inches or more than 1.281 inches.

Beginning with the cradle 36, it is substantially cup-shaped. In this way, the cradle 36 is adapted to receive a ball 46 (shown in FIGS. 11 and 12). The ball 46 may be of a type that is typically employed in conventional oil pumping systems. When the pump is in a downward motion, the cradle 36 retains the ball 46. This allows the ball 46 to be held calmly in position, thereby allowing fluid to pass freely through channels 50 and around the ball 46 with ease, as discussed further below. With the ball 46 being held calmly in position, violent action of the ball 46 is eliminated, thereby obviating a need for a hard liner to be included in the valve cage 10, unlike typical prior art valve cages. In one embodiment, the cradle 36 may have a height that is approximately 0.5 inches. In another embodiment, the cradle may have a height that is less than 0.5 inches or more than 0.5 inches. The cradle 36 includes a port 42. In a preferred embodiment, port 42 is circular. The port 42 may have a diameter of approximately 0.25 inches. However, the port 42 may have a diameter of a different dimension, as desired. During pumping operations, when the pump is in an upward motion and the ball 46 has been released from the cradle 36, fluid that is being pumped may pass through port 42.

The ribs 38 extend upwardly from the base 40 to the cradle 36. In this embodiment, the ribs 38 terminate at the north end 32 of the insert 30. In a preferred embodiment, the ribs 38 extend upwardly from the base 40 to the cradle 36 in a clockwise rotational direction at approximately 30 degrees. However, the orientation of the ribs 38 may deviate from this. As seen in this embodiment, the ribs 38 may protrude from the exterior of the cradle 36. Adjacent ribs 38 define channels 50 therebetween. As seen in this embodiment, preferably, the width of the channels 50 is greater than the width of the ribs 38. In one embodiment, the channels 50 may have a width that is approximately five times greater than a width of the ribs 38. The channels 50 provide a passageway for fluid that is being pumped. Preferably, and as seen in this embodiment, the ribs 38, and accordingly the channels 50, are angled, thereby providing an overall radial configuration of the insert 30. In this way, as compared with prior art valve cages, a more laminar flow of fluid may be accomplished. This allows fluid to have passage through a space that is greater than a width of a conventional seat opening (not shown), thereby providing improved passage through the valve cage 10, compared with prior art valve cages. In a preferred embodiment, three ribs 38 are employed, but a different number of ribs 38 could be used, as desired. Preferably, as shown in this embodiment, the ribs 38 are equidistantly spaced apart.

Figure 11:
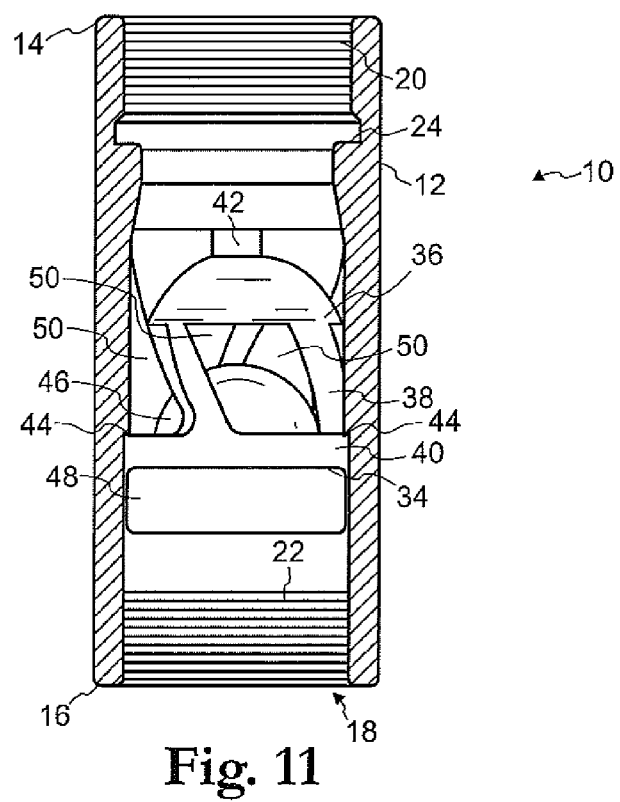
FIG. 11 is a cut away view of a valve cage device, illustrating the positioning of a ball and seat therein in a first orientation, consistent with an embodiment of the present invention.
Figure 12:
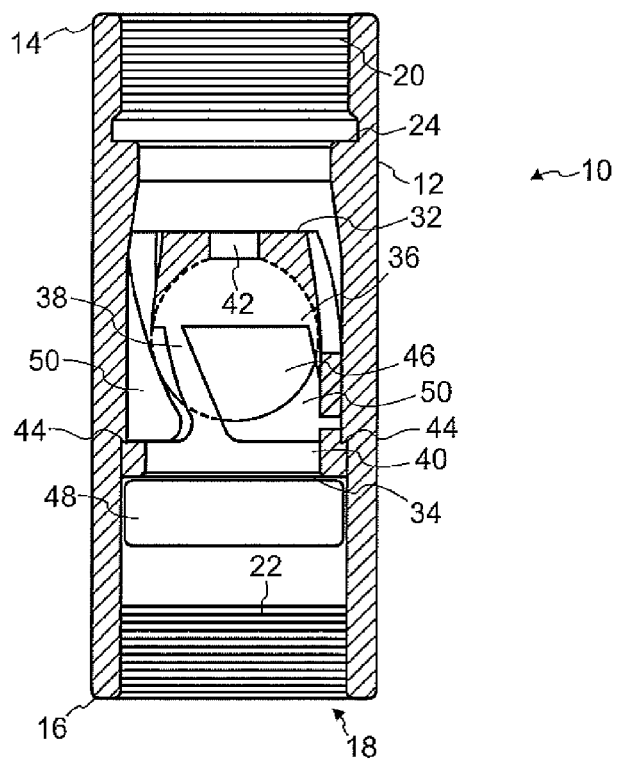
FIG. 12 is a cut away view of a valve cage device, illustrating the positioning of a ball and seat therein in a second orientation, consistent with an embodiment of the present invention.

The base 40, as seen in this embodiment, is substantially ring-shaped. The base 40 is adapted to abut a conventional seat 48 (as seen in FIGS. 11 and 12). In one embodiment, the base 40 may have an exterior diameter ranging from approximately 0.927 to 1.1692 inches and a height of approximately 0.1875 inches. However, the exterior diameter and the height of the base 40 may deviate from these dimensions, even substantially, in either direction. Preferably, the height of the base 40 is less than the height of the cradle 36. The base 40 preferably includes an angled hook or lip 44. In one embodiment, the lip 44 may be angled at approximately 60 degrees from vertical. When the insert 30 is pressed into the housing 12, the lip 44 engages itself against the interior portion of the housing 12. As a result, once a seat plug (not shown) is coupled to the valve cage 10, a tight seal is created, which prevents fluid from washing by during pumping operations and leaking. When the pump is on an upstroke, the ball 46 should fall straight downward onto the seat 48, guided by the insert 30. This allows for faster seating of the ball 46 compared with prior art designs, thereby reducing pump stroke loss and providing for more efficient pumping.

As shown in the embodiment in FIGS. 1 and 9, for example, preferably the cradle 36 has an exterior diameter that is less than an exterior diameter of the base 40. In this way, the insert 30 has an overall tapered configuration. Coupled with the angling of the ribs 38, this tapering is helpful particularly when solids begin to accumulate on the ball 46 during pumping operations. In this regard, even when solids accumulate on the ball 46, the ball 46 should fall freely back onto the seat 48. Further, the ball 46 makes contact with the ribs 38. With the angling of the ribs 38, as the ball 46 falls from the direction of the cradle 36 to the seat 48, the point of contact of the ball 46 with the ribs 38 changes, helping to prevent solids from accumulating, and thereby, from causing the ball 46 to stick. This is an advantage over typical prior art valve cages in which the inserts thereof are not tapered and do not have angled ribs. With such typical prior art valve cages, solids are permitted to stack up during pumping operations and eventually wedge themselves against the ball, thereby preventing the ball from reseating.

Turning now to FIGS. 11 and 12, the valve cage 10 can be seen with a conventional ball 46 and seat 48 positioned therein. FIG. 11 shows the ball 46 resting on the seat 48, which would occur during pumping operations when the pump is on an upstroke. During this time, fluid that is being pumped would pass freely in a general upward direction around the ball 46 and through channels 50 and port 42. FIG. 12 shows the ball 46 being retained by the cradle 36, which would occur during pumping operations when the pump is on a downstroke. During pumping operations, the overall design of the valve cage 10 enables a zone of relatively low pressure to be created in a center portion of the valve cage 10 and permits high pressure fluid to move around the ball 46. The ball 46 will fall faster onto the seat 48, compared with prior art valve cage designs. As a result, the speed of valve closure is increased, thereby increasing overall effectiveness of the pump.

Figure 13:
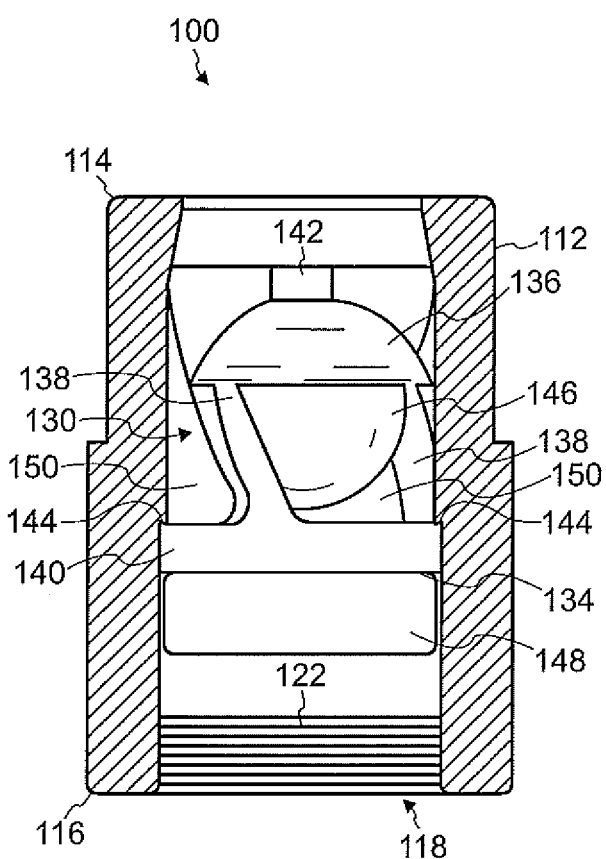
FIG. 13 is a cut away view of a valve cage device, consistent with an embodiment of the present invention.

Referring now to FIG. 13, another embodiment of a valve cage device (valve cage 100) consistent with an embodiment of the present invention is shown. The valve cage 100 is similar to the valve cage 10, but is designed as a standing valve cage. The valve cage 100 generally comprises the following basic components: a housing 112, and an insert 130. The valve cage 100 is preferably a one-piece structure and may be composed of a hardened material, such as carbide, an alloy or some other suitable material capable of withstanding conditions present in typical oil well environments. Turning first to the housing 112, as with the valve cage 10, the overall configuration of the housing 112 in the valve cage 100 is substantially tubular. A longitudinal channel 118 runs through the housing 112, such that the housing 112 is adapted to receive insert 130 therein. The valve cage 100 includes a north end 114 and a south end 116. An interior portion of the housing 112 proximate the south end 116 preferably includes a threaded region 122, such that the south end 116 of the valve cage 100 may be coupled to a conventional seating device (not shown) or the like. In one embodiment, the threaded region 122 may comprise threading ranging from approximately 10"-14 to 1.25"-14 threading, or some other suitable threading, as may be suitable for housings having various dimensions. In one embodiment, the threaded region 122 may have an overall height ranging from approximately 0.656 to 0.680 inches, or some other height that may be suitable for housings of various dimensions. The threaded region 122 may comprise either a male or female threading configuration, as desired.

Turning now to the insert 130, as with the valve cage 10, the insert 130 of the valve cage 100 comprises the following main components, beginning from a north end to a south end: a cradle 136, a plurality of ribs 138, and a base 140. The insert 130 is adapted to be pressed into the housing 112 of the valve cage 100, such that an outer portion of the insert 130 abuts against an inner portion of the housing 112. In one embodiment, the insert 130 may have an overall length from ranging from approximately 1.003 to 1.281 inches. In another embodiment, the insert 130 may have an overall length that is less than 1.003 inches or more than 1.281 inches.

Beginning with the cradle 136, again, as with the valve cage 10, the cradle 136 of the valve cage 100 is substantially cup-shaped. In this way, the cradle 136 is adapted to receive ball 146. Ball 146 may be of a type that is typically employed in conventional oil pumping systems. When the pump is in an upward motion, the ball 146 moves upward into the cradle 136, which retains the ball 146. This allows the ball 146 to be held calmly in position, thereby allowing fluid to pass freely through channels 150 and around the ball 146 with ease. With the ball 146 being held calmly in position, violent action of the ball 146 is eliminated, thereby obviating a need for a hard liner to be included in the valve cage 100, unlike typical prior art valve cages. In one embodiment, the cradle 136 may have a height that is approximately 0.5 inches. In another embodiment, the cradle may have a height that is less than 0.5 inches or more than 0.5 inches. The cradle 136 includes a port 142. In a preferred embodiment, port 142 is circular. The port 142 may have a diameter of approximately 0.25 inches. However, the port 142 may have a diameter of a different dimension, as desired. During pumping operations, when the pump is in a downward motion, the ball 146 is released from the cradle 136, and fluid that is being pumped may pass through port 142.

The ribs 138 extend upwardly from the base 140 to the cradle 136. In this embodiment, the ribs 138 terminate at a north end of the insert 130. In a preferred embodiment, the ribs 138 extend upwardly from the base 140 to the cradle 136 in a clockwise rotational direction at approximately 30 degrees. However, the orientation of the ribs 138 may deviate from this. As seen in this embodiment, the ribs 138 may protrude from the exterior of the cradle 136. Adjacent ribs 138 define channels 150 therebetween. As seen in this embodiment, preferably, the width of the channels 150 is greater than the width of the ribs 138. In one embodiment, the channels 150 may have a width that is approximately five times greater than a width of the ribs 138. The channels 150 provide a passageway for fluid that is being pumped. Preferably, and as seen in this embodiment, the ribs 138, and accordingly the channels 150, are angled, thereby providing an overall radial configuration of the insert 130. In this way, as compared with prior art valve cages, a more laminar flow of fluid may be accomplished. This allows fluid to have passage through a space that is greater than a width of a conventional seat opening (not shown), thereby providing improved passage through the valve cage 100, compared with prior art valve cages. In addition, the angular configuration of the ribs 138 assists with proper filling of the pump barrel (not shown), as it provides for faster fluid passage with greater flow capacity compared with prior art valve cage designs. In a preferred embodiment, three ribs 138 are employed, but a different number of ribs 138 could be used, as desired. Preferably, the ribs 138 are equidistantly spaced apart.

Preferably, the base 140 is substantially ring-shaped. The base 140 is adapted to abut a conventional seat 148. In one embodiment, the base 140 may have an exterior diameter ranging from approximately 0.927 to 1.1692 inches and a height of approximately 0.1875 inches. However, the exterior diameter and the height of the base 140 may deviate from these dimensions, even substantially, in either direction Preferably, the height of the base 140 is less than the height of the cradle 136. As with the valve cage 10, the base 140 preferably includes an angled hook or lip 144. In one embodiment, the lip 144 may be angled at approximately 60 degrees from vertical. When the insert 130 is pressed into the housing 112, the lip 144 engages itself against the interior portion of the housing 112. As a result, once a seating device (not shown) is coupled to the valve cage 100, a tight seal is created, which prevents fluid from washing by during pumping operations and leaking. When the pump is on a downstroke, the ball 146 should fall straight downward onto the seat 148, guided by the insert 130. This allows for faster seating of the ball 146 compared with prior art designs, thereby reducing pump stroke loss and providing for more efficient pumping. Further, due to the angular configuration of the ribs 138, solids may be forced away from the area of the seat 148, allowing the ball 146 to seat with less debris interference compared with prior art valve cage designs. This assists in providing longer life for the ball 146 and seat 148.

As shown in this embodiment, preferably the cradle 136 has an exterior diameter that is less than an exterior diameter of the base 140. In this way, the insert 130 has an overall tapered configuration. Coupled with the angling of the ribs 138, this tapering is helpful particularly when solids begin to accumulate on the ball 146 during pumping operations. In this regard, even when solids accumulate on the ball 146, the ball 146 should fall freely back onto the seat 148. Further, the ball 146 makes contact with the ribs 138. With the angling of the ribs 138, as the ball 146 falls from the direction of the cradle 136 to the seat 148, the point of contact of the ball 146 with the ribs 138 changes, helping to prevent solids from accumulating, and thereby, from causing the ball 146 to stick. This is an advantage over typical prior art valve cages in which the inserts thereof are not tapered and do not have angled ribs. With such typical prior art valve cages, solids are permitted to stack up during pumping operations and eventually wedge themselves against the ball, thereby preventing the ball from reseating.

In a preferred embodiment, the valve cage 100 is configured such that when the valve cage 100 is employed with a conventional pumping apparatus or the like, any space between the ball 146 and a compressive area for a traveling valve is relatively limited, or "near zero." This may especially provide assistance in gassy conditions, where gas locking may be a problem.

Referring now to FIGS. 14 through 19, another embodiment of an insert, hereinafter "insert 60" is shown. The insert 60 is adapted to be a component of the valve cage 10 or valve cage 100, and may be employed as an alternative to the insert 30 of the valve cage 10 or the insert 130 of the valve cage 100.

Figure 14:
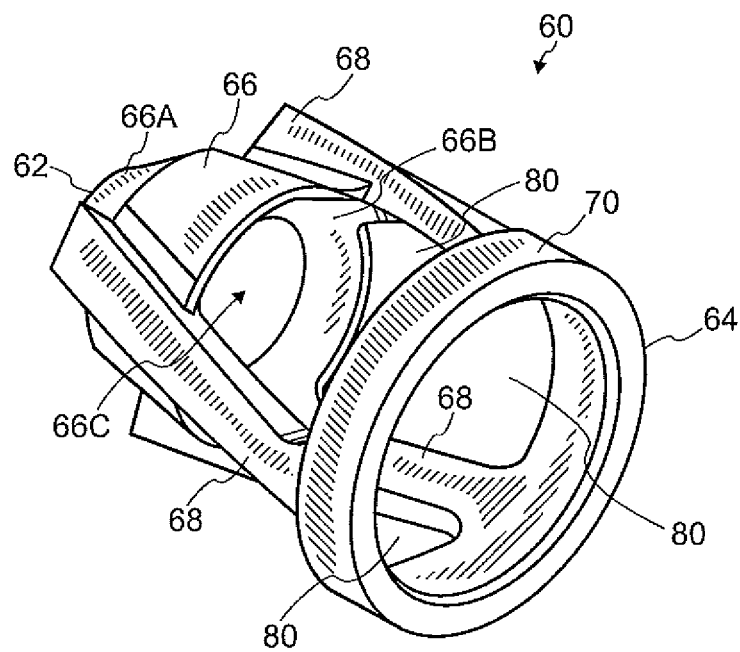
FIG. 14 is a perspective view of an insert portion of a valve cage device, consistent with an embodiment of the present invention.
Figure 15:
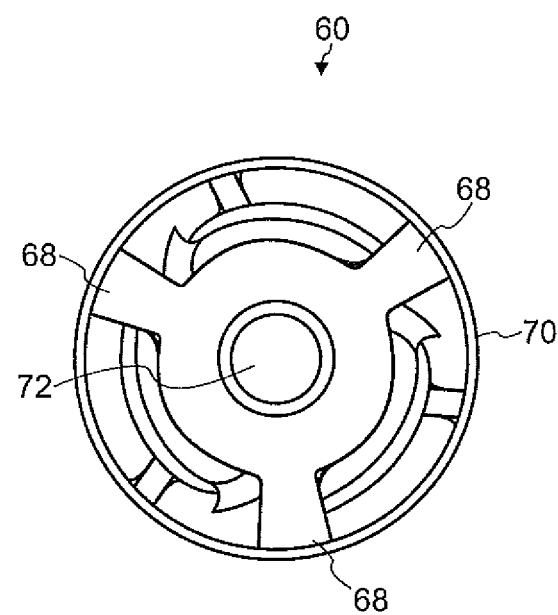
FIG. 15 is a top view of the insert portion of FIG. 14.
Figure 16:
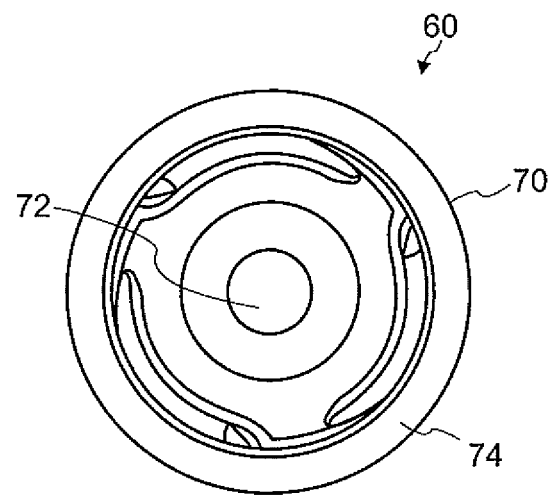
FIG. 16 is a bottom view of the insert portion of FIG. 14.
Figure 17:
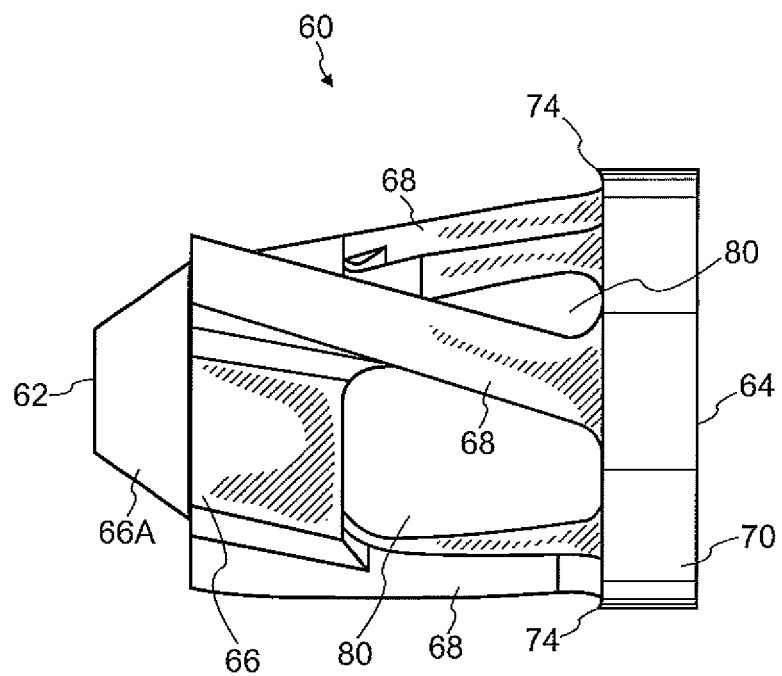
FIG. 17 is a side view of the insert portion of FIG. 14.
Figure 18:
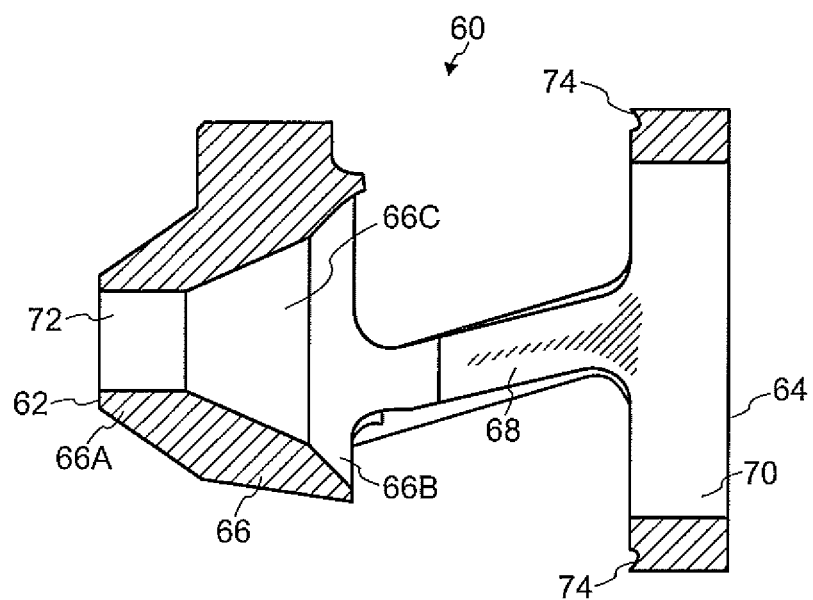
FIG. 18 is a first cross-sectional view of the insert portion of FIG. 14.

Turning first to FIGS. 14 and 17, it can be seen that the insert 60 comprises the following main components, beginning from a north end 62 to a south end 64: a cradle 66, a plurality of ribs 68, and a base 70. The insert 60 is adapted to be pressed into the housing 12 of the valve cage 10, or the housing 112 of the valve cage 100, such that an outer portion of the insert 60 abuts against an inner portion of the housing 12 of the valve cage 10 or the housing 112 of the valve cage 100. In one embodiment, the insert 60 may have an overall length from the north end 62 to the south end 64 ranging from approximately 1.288 to 3.535 inches. In another embodiment, the insert 60 may have an overall length that is less than 1.288 inches or more than 3.535 inches.

Generally, the insert 60 is configured similarly to the insert 30 and insert 130, with the exception of the cradle 66 of the insert 60.

Beginning with the cradle 66, it is substantially cup-shaped. The cradle 66 includes an extended nose region 66A and a shoulder 66B. As seen in the embodiment in FIGS. 14 and 17, preferably, the nose region 66A tapers upwardly. In one embodiment, the cradle 66 may have an overall height ranging from approximately 0.473 to 1.715 inches, wherein the nose region 66A ranges from approximately 0.188 to 0.625 inches in height. However, the overall height of the cradle 66 and the height of the nose region 66A may deviate from these dimensions, even substantially, in either direction. The cradle 66 further includes a port 72, as shown in FIGS. 15, 16, 18 and 19. In a preferred embodiment, port 72 is circular. The port 72 may have a diameter ranging from approximately 0.1875 to 0.5 inches. However, the port 72 may have a diameter of a different dimension, as desired. The shoulder 66B is preferably positioned circumferentially along an interior portion of the cradle 66, as seen in FIG. 14. Preferably, the shoulder 66B has a curvature that corresponds to an outer curvature of a ball (such as the ball 46, as shown in FIGS. 11 and 12, or the ball 146, as shown in FIG. 13). In this way, the shoulder 66B is adapted to receive the ball during pumping operations. With the configuration of the cradle 66, when the shoulder 66B receives the ball, the ball is prevented from traveling further upwardly into the nose region 66A of the cradle 66. In this way, an open area 66C remains between the nose region 66A and the ball when the ball is received by the shoulder 66B. This open area 66C allows for additional energy to be employed in the area of the cradle 66 during pumping operations, in that the open area 66C allows for additional pounds per square inch, which, in turn, helps push the ball off the cradle 66 during pumping operations. In one embodiment, open area 66C may have a diameter at its widest point ranging from approximately 0.4 to 1.180 inches. However, open area 66C may have a diameter of a different dimension, as desired.

When the insert 60 is employed in a traveling valve, such as the valve cage 10, the shoulder 66B of the cradle 66 retains the ball when the pump is in a downward motion. This allows the ball to be held calmly in position, thereby allowing fluid to pass freely through channels 80 and around the ball with ease. With the ball being held calmly in position, violent action of the ball is eliminated, thereby obviating a need for a hard liner to be included in the valve cage 10, unlike typical prior art valve cages. During pumping operations, when the pump is in an upward motion and the ball has been released from the shoulder 66B of the cradle 66, fluid that is being pumped may pass through open area 66C and outward through port 72.

When the insert 60 is employed in a standing valve, such as the valve cage 100, during pumping operations, when the pump is in an upward motion, the ball moves upward into the shoulder 66B of the cradle 66, and the shoulder 66B retains the ball. This allows the ball to be held calmly in position, thereby allowing fluid to pass freely through channels 80 and around the ball with ease. With the ball being held calmly in position, violent action of the ball is eliminated, thereby obviating a need for a hard liner to be included in the valve cage 100, unlike typical prior art valve cages. During pumping operations, when the pump is in a downward motion, the ball is released from the shoulder 66B of the cradle 66, and fluid that is being pumped may pass through open area 66C and outward through port 72.

The ribs 68 of the insert 60 extend upwardly from the base 70 to the cradle 66. In this embodiment, the ribs 68 terminate at the north end 62 of the insert 60. In a preferred embodiment, the ribs 68 of the insert 60 extend upwardly from the base 70 to the cradle 66 in a clockwise rotational direction at approximately 30 degrees. However, the orientation of the ribs 68 may deviate from this. As seen in this embodiment, the ribs 68 may protrude from the exterior of the cradle 66. Adjacent ribs 68 define channels 80 therebetween. As seen in this embodiment, preferably, the width of the channels 80 is greater than the width of the ribs 68. In one embodiment, the channels 80 may have a width that is approximately five times greater than a width of the ribs 68. The channels 80 provide a passageway for fluid that is being pumped. Preferably, and as seen in this embodiment, the ribs 68, and accordingly the channels 80, are angled, thereby providing an overall radial configuration of the insert 60. In this way, as compared with prior art valve cages, a more laminar flow of fluid may be accomplished. This allows fluid to have passage through a space that is greater than a width of a conventional seat opening (not shown), thereby providing improved passage through the valve cage 10 or valve cage 100, compared with prior art valve cages. In a preferred embodiment, three ribs 68 are employed, but a different number of ribs 68 could be used, as desired. Preferably, as shown in this embodiment, the ribs 68 are equidistantly spaced apart.

The base 70, as seen in this embodiment, is substantially ring-shaped. The base 70 is adapted to abut a conventional seat (such as the seat 48 shown in FIGS. 11 and 12, or the seat 148 shown in FIG. 13). In one embodiment, the base 70 may have an exterior diameter ranging from approximately 0.927 to 1.1692 inches and a height of approximately 0.188 to 0.688 inches. However, the exterior diameter and the height of the base 70 may deviate from these dimensions, even substantially, in either direction. Preferably, the height of the base 70 is less than the height of the cradle 66. The base 70 preferably includes an angled hook or lip 74. In one embodiment, the lip 74 may be angled at approximately 60 degrees from vertical. When the insert 60 is pressed into the housing 12 of the valve cage 10 or the housing 112 of the valve cage 100, the lip 74 engages itself against the interior portion of the housing 12 or housing 112. As a result, once a seat plug or other seating device (not shown) is coupled to the valve cage 10 or valve cage 100, a tight seal is created, which prevents fluid from washing by during pumping operations and leaking. During pumping operations, when the ball is released from the shoulder 66B of the cradle 66, the ball should fall straight downward onto the seat, guided by the insert 60. This allows for faster seating of the ball compared with prior art designs, thereby reducing pump stroke loss and providing for more efficient pumping.

Figure 19:
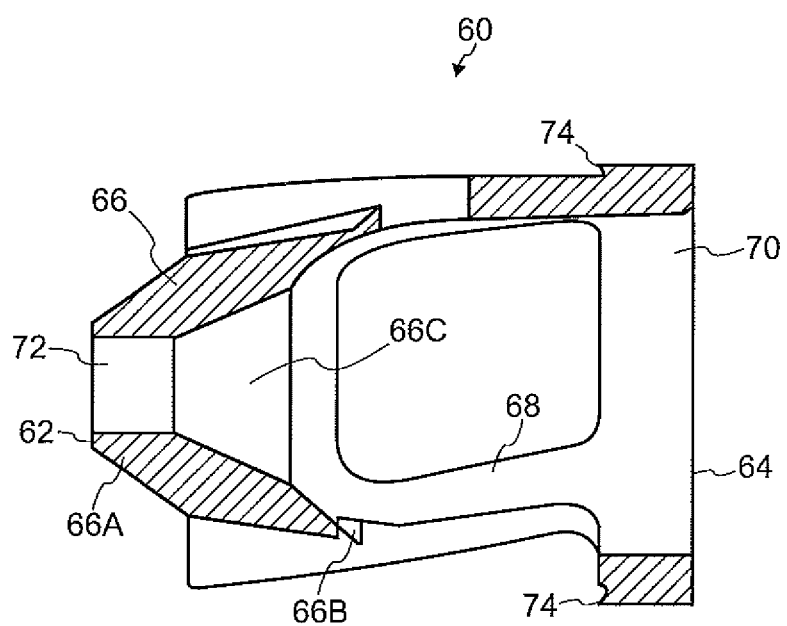
FIG. 19 is a second cross-sectional view of the insert portion of FIG. 14.

As shown in the embodiment in FIGS. 14 and 19, for example, preferably the cradle 66 has an exterior diameter that is less than an exterior diameter of the base 70. In this way, the insert 60 has an overall tapered configuration. Coupled with the angling of the ribs 68, this tapering is helpful particularly when solids begin to accumulate on the ball during pumping operations. In this regard, even when solids accumulate on the ball, the ball should fall freely back onto the seat. Further, the ball makes contact with the ribs 68. With the angling of the ribs 68, as the ball falls from the direction of the cradle 66 to the seat, the point of contact of the ball with the ribs 68 changes, helping to prevent solids from accumulating, and thereby, from causing the ball to stick. This is an advantage over typical prior art valve cages in which the inserts thereof are not tapered and do not have angled ribs. With such typical prior art valve cages, solids are permitted to stack up during pumping operations and eventually wedge themselves against the ball, thereby preventing the ball from reseating.

While the invention has been particularly shown and described with reference to the preferred embodiments thereof, it will be understood by those skilled in the art that the foregoing and other changes in form and details may be made therein without departing from the spirit and scope of the invention. For example, while the various components of the invention have been described with reference to various dimensions thereof, it will be recognized by those skilled in the art that substantial benefit could be derived from alternative configurations of the invention in which different dimensions are employed, including those that deviate from the preferred dimensions, even substantially, in either direction.

I claim:

1. A valve cage for use in a pumping apparatus comprising, in combination:
   a housing having a north end and a south end, wherein a first interior portion of the housing proximate the north end includes a first threaded region and a second interior portion of the housing proximate the south end includes a second threaded region; and
   an insert adapted to be positioned in the housing, comprising, in combination:
      a base portion adapted to abut a seat, the base portion having an exterior diameter, wherein a top of the base portion includes an inwardly and downwardly angled lip adapted to abut a third interior portion of the housing, wherein the lip engages itself against the third interior portion of the housing when the insert is positioned in the housing;
      a cradle portion adapted to releasably retain a ball, wherein the cradle portion is substantially cup-shaped, and wherein the cradle portion includes one circular port centrally positioned at a north end of the cradle portion; and
      a plurality of angled ribs, wherein each rib of the plurality of ribs extends rotationally upwards an entire length from the base portion to the cradle portion, the plurality of angled ribs terminate at a top of the cradle portion, wherein the plurality of ribs define channels therebetween;
      wherein a greatest exterior diameter of the cradle portion is less than a greatest exterior diameter of the base portion, such that the insert is upwardly tapered.

2. The valve cage of claim 1, wherein the cradle portion includes a shoulder positioned circumferentially about an interior region of the cradle portion, wherein the shoulder is adapted to releasably retain a ball.

3. The valve cage of claim 1, wherein the cradle portion includes a nose region, wherein the nose region tapers upwardly from the plurality of ribs.

4. The valve cage of claim 1, wherein the first threaded region is adapted to be coupled to a south end of a pump plunger and the second threaded region is adapted to be coupled to a north end of a seat plug.

5. The valve cage of claim 1, wherein the insert includes three ribs.

6. A valve cage for use in a pumping apparatus comprising, in combination:
   a housing having a north end and a south end, wherein an interior portion of the housing proximate the south end includes a threaded region; and
   an insert adapted to be positioned in the housing, comprising, in combination:
      a base portion adapted to abut a seat, wherein a top of the base portion includes an inwardly and downwardly angled lip adapted to abut an interior portion of the housing, wherein the lip engages itself against the third interior portion of the housing when the insert is positioned in the housing;
      a cradle portion adapted to releasably retain a ball, wherein the cradle portion is substantially cup-shaped, and wherein the cradle portion includes one circular port centrally positioned at a north end of the cradle portion; and
      a plurality of angled ribs, wherein each rib of the plurality of ribs extends rotationally upwards an entire length from the base portion to the cradle portion, wherein the plurality of ribs define channels therebetween;
      wherein a greatest exterior diameter of the cradle portion is less than a greatest exterior diameter of the base portion, such that the insert is upwardly tapered;
      wherein the plurality of angled ribs terminate at a top of the cradle portion.

7. The valve cage of claim 6, wherein the threaded region of the interior portion of the housing proximate the south end is adapted to be coupled to a seating device.

8. The valve cage of claim 6, wherein the cradle portion includes a shoulder positioned circumferentially about an interior region of the cradle portion, wherein the shoulder is adapted to releasably retain a ball.

9. The valve cage of claim 6, wherein the cradle portion includes a nose region, wherein the nose region tapers upwardly from the plurality of ribs.

10. The valve cage of claim 6, wherein the insert includes three ribs.

11. The valve cage of claim 6 composed of one of carbide and an alloy.

12. An insert for a valve cage of a pumping apparatus comprising, in combination:
   a base portion adapted to abut a valve seat;
   a cradle portion adapted to releasably retain a ball, wherein the cradle portion is substantially cup-shaped, and wherein the cradle portion includes one circular port centrally positioned at a north end of the cradle portion; and
   a plurality of angled ribs, wherein each rib of the plurality of ribs extends rotationally upwards an entire length from the base portion to the cradle portion, wherein the plurality of angled ribs terminate at a top of the cradle portion, wherein the plurality of ribs define channels therebetween;
   wherein a greatest exterior diameter of the cradle portion is less than a greatest exterior diameter of the base portion, such that the insert is upwardly tapered.

13. The insert of claim 12, wherein the cradle portion includes a nose region, wherein the nose region tapers upwardly from the plurality of ribs.

14. The insert of claim 12, wherein the cradle portion includes a shoulder positioned circumferentially about an interior region of the cradle portion, wherein the shoulder is adapted to releasably retain a ball.

15. The insert of claim 12 comprising three ribs.

16. The insert of claim 12, wherein the plurality of angled ribs extending rotationally upwards an entire length from the base portion to the cradle portion rotate at an angle of 30 degrees.

17. The insert of claim 12, wherein the plurality of angled ribs extending rotationally upwards an entire length from the base portion to the cradle portion rotate clockwise.

18. The insert of claim 12, wherein the plurality of angled ribs have a width smaller than the channels defined therebetween.

* * * * *